United States Patent
Tanimura

(10) Patent No.: US 9,442,288 B2
(45) Date of Patent: Sep. 13, 2016

(54) METHOD OF ASSEMBLING AND ADJUSTING A MULTI-BEAM SCANNING OPTICAL APPARATUS AND METHOD OF MANUFACTURING A MULTI-BEAM SCANNING OPTICAL APPARATUS

(75) Inventor: Ken Tanimura, Osaka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 460 days.

(21) Appl. No.: 13/539,588

(22) Filed: Jul. 2, 2012

(65) Prior Publication Data
US 2013/0014380 A1  Jan. 17, 2013

(30) Foreign Application Priority Data

Jul. 11, 2011 (JP) ................... 2011-152856
Jun. 14, 2012 (JP) ................... 2012-134981

(51) Int. Cl.
| | | |
|---|---|---|
| H01S 4/00 | (2006.01) |
| G02B 26/12 | (2006.01) |
| B41J 2/47 | (2006.01) |
| G06K 15/12 | (2006.01) |
| G02B 26/08 | (2006.01) |

(52) U.S. Cl.
CPC ............. *G02B 26/126* (2013.01); *B41J 2/473* (2013.01); *G02B 26/0825* (2013.01); *G02B 26/127* (2013.01); *G06K 15/1219* (2013.01); *G06K 15/1257* (2013.01); *G02B 26/123* (2013.01); *Y10T 29/49002* (2015.01)

(58) Field of Classification Search
CPC .............. B41J 2/473; G06K 15/1219; G06K 15/1257; Y10T 29/49002; Y10T 29/49; G02B 26/0825; G02B 26/126; G02B 26/127; G02B 26/123
USPC ................ 29/592.1; 358/1.4, 1.5, 1.9, 526; 359/202.1, 204.1, 204.4, 210.2, 206, 359/205.1; 347/225, 244, 258, 241, 129, 347/231, 237, 256, 261, 259
See application file for complete search history.

(56) References Cited

U.S. PATENT DOCUMENTS

| | | | | |
|---|---|---|---|---|
| 6,452,687 B1 | 9/2002 | Suzuki et al. | |
| 7,535,594 B2* | 5/2009 | Yoshizawa | ........... | G02B 26/123 358/1.4 |
| RE42,865 E * | 10/2011 | Suzuki | ................. | G02B 26/127 347/241 |
| 8,217,980 B2* | 7/2012 | Tanimura | .............. | G02B 26/123 347/244 |
| 8,314,824 B2* | 11/2012 | Yamawaki | ........... | G02B 26/124 347/224 |
| 2011/0063704 A1* | 3/2011 | Miyatake | ............. | G02B 26/123 359/204.1 |

FOREIGN PATENT DOCUMENTS

| | | |
|---|---|---|
| JP | 10319336 A | 12/1998 |
| JP | 11326804 A | 11/1999 |
| JP | 2004258182 A | 9/2004 |

* cited by examiner

*Primary Examiner* — Peter DungBa Vo
*Assistant Examiner* — Azm Parvez
(74) *Attorney, Agent, or Firm* — Rossi, Kimms & McDowell LLP

(57) ABSTRACT

Provided is a method of assembling and adjusting multi-beam scanning optical apparatus including a light source unit having multiple light emitting points, a deflecting unit configured to deflect multiple light beams emitted from the light source unit, and an imaging optical system configured to image the multiple light beams deflected by the deflecting unit on a surface to be scanned, the method including: adjusting incident positions of the multiple light beams in a sub-scanning direction, which are entered into an imaging optical element constituting the imaging optical system to adjust irradiated positions of the multiple light beams on the surface to be scanned; and adjusting the irradiated positions of the multiple light beams on the surface to be scanned in the sub-scanning direction without changing the incident positions.

10 Claims, 13 Drawing Sheets

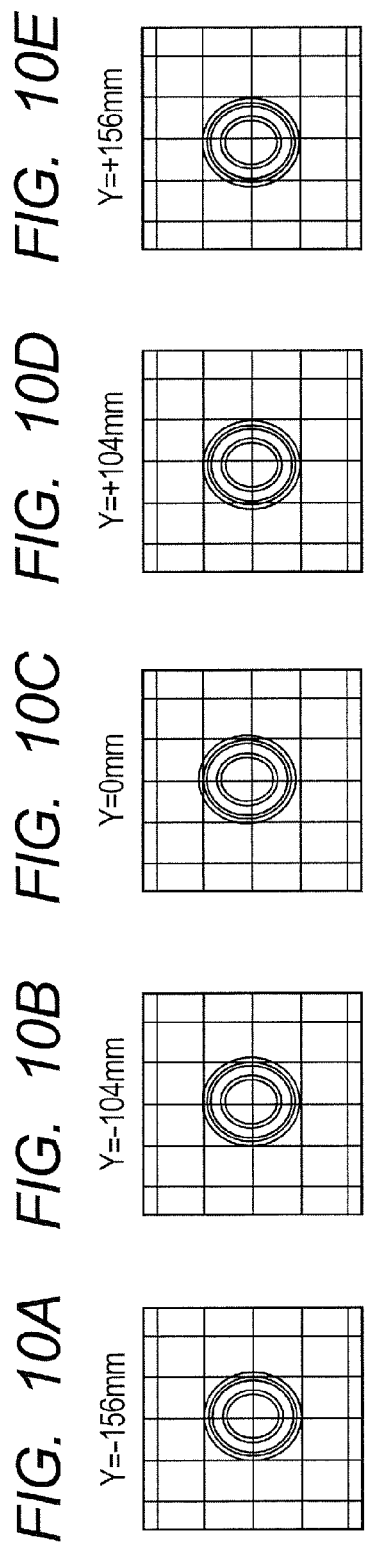

METHOD OF ASSEMBLING AND ADJUSTING A MULTI-BEAM SCANNING OPTICAL APPARATUS AND METHOD OF MANUFACTURING A MULTI-BEAM SCANNING OPTICAL APPARATUS

BACKGROUND OF THE INVENTION

1. Field of the Invention

The present invention relates to a method of assembling and adjusting a multi-beam scanning optical apparatus and a method of manufacturing a multi-beam scanning optical apparatus, and more particularly, to a method of assembling and adjusting a multi-beam scanning optical apparatus and a method of manufacturing a multi-beam scanning optical apparatus, which are suitable for a multi-beam scanning optical apparatus used for an image forming apparatus employing an electrophotographic process, such as a laser beam printer, a digital copy machine, and a multi-function printer.

2. Description of the Related Art

In a scanning optical apparatus of an image forming apparatus such as a laser beam printer (LBP), conventionally, a light beam emitted from a light source unit, which is optically modulated in accordance with an image signal, is periodically deflected by a deflecting unit including a rotating polygon mirror. The light beam that has undergone deflection scanning is then focused on a surface of a photosensitive recording medium (photosensitive drum) in a spot shape by an imaging optical system having an fθ characteristic to optically scan the surface, thus recording an image on the surface of the photosensitive recording medium.

Under increasing need for a printing machine having a high printing speed, adequate measures taken in the scanning optical apparatus include, for example, (1) increasing the rotation speed of a deflecting unit (such as the polygon mirror), (2) increasing the number of mirror planes of the polygon mirror, and (3) increasing the number of light beams (using a multi-beam laser, combining light beams by using a prism, or causing multiple light beams to be entered into a polygon mirror at different angles in a deflecting direction). However, the measures (1) and (2) raise such problems as a limit of the rotation speed and a restriction of a size of the polygon mirror due to the increase of the number of the mirror planes thereof, respectively, and hence a multi-beam scanning optical apparatus using a multi-beam light source of the measure (3) is increasingly used.

However, in the multi-beam scanning optical apparatus, a scanning interval misalignment or a scanning position misalignment (misregistration) in a sub-scanning direction of the multi-beam may occur due to a mounting error of each optical element. To cope with this problem, Japanese Patent Application Laid-Open No. H10-319336 discloses a method of adjusting a sub-scanning interval of the multi-beam on a surface of a photosensitive drum, in which a semiconductor laser is rotated about a center axis. In addition, although a multi-beam laser is not employed, Japanese Patent Application Laid-Open No. H11-326804 discloses an adjustment method of suppressing a misregistration in a sub-scanning direction between different colors by turning a diffractive optical element in a color image forming apparatus including multiple scanning optical apparatus. Further, as disclosed in Japanese Patent Application Laid-Open No. 2004-258182, a method of correcting a misregistration of a scanning line in a sub-scanning direction has been known, in which an imaging optical element is moved in the sub-scanning direction.

However, when the methods described in Japanese Patent Application Laid-Open No. H11-326804 and Japanese Patent Application Laid-Open No. 2004-258182 are applied to correct the scanning position misalignment (misregistration) in the multi-beam scanning optical apparatus, there occurs a problem that the sub-scanning interval between beams of the multi-beam on the surface of the photosensitive drum becomes non-constant relative to an image height. This phenomenon is caused by a fact that, when the imaging optical element is moved to correct the scanning position misalignment (misregistration) in the sub-scanning direction, a sub-scanning position on the imaging optical element is largely deviated from a position on which the multiple laser beams are supposed to be incident.

SUMMARY OF THE INVENTION

In view of the above, the present invention provides a method of assembling and adjusting a multi-beam scanning optical apparatus and a method of manufacturing a multi-beam scanning optical apparatus that enable a high-speed and highly-fine printing by sufficiently correcting a scanning position misalignment of a multi-beam with a uniform multi-beam interval in a sub-scanning direction.

According to one aspect of the present invention of a method of assembling and adjusting a multi-beam scanning optical apparatus, the method includes a light source unit having multiple light emitting points, a deflecting unit configured to deflect multiple light beams emitted from the light source unit, and an imaging optical system configured to image the multiple light beams deflected by the deflecting unit on a surface to be scanned, the method including: adjusting incident positions of the multiple light beams in a sub-scanning direction, which are entered into an imaging optical element constituting the imaging optical system, to thereby adjust irradiated positions of the multiple light beams on the surface to be scanned; and adjusting the irradiated positions of the multiple light beams on the surface to be scanned in the sub-scanning direction without changing the incident positions.

According to the present invention, degradation of an image can be suppressed and a high-speed and highly-fine printing can be achieved in the multi-beam scanning optical apparatus.

Further features of the present invention will become apparent from the following description of exemplary embodiments with reference to the attached drawings.

BRIEF DESCRIPTION OF THE DRAWINGS

FIG. 3A is a diagram illustrating an asymmetry of a sub-scanning irradiation position interval of a multi-beam due to a change of posture of a mirror 9a.

FIG. 3B is a diagram illustrating the asymmetry of the sub-scanning irradiation position interval of the multi-beam due to the change of posture of the mirror 9a.

FIG. 10A is a diagram illustrating a spot profile on a surface to be scanned according to the first embodiment of the present invention (Y=−156 mm).

FIG. 10B is a diagram illustrating the spot profile on the surface to be scanned according to the first embodiment of the present invention (Y=−104 mm).

FIG. 10C is a diagram illustrating the spot profile on the surface to be scanned according to the first embodiment of the present invention (Y=0 mm).

FIG. 10D is a diagram illustrating the spot profile on the surface to be scanned according to the first embodiment of the present invention (Y=+104 mm).

FIG. 10E is a diagram illustrating the spot profile on the surface to be scanned according to the first embodiment of the present invention (Y=+156 mm).

DESCRIPTION OF THE EMBODIMENTS

Exemplary embodiments of the present invention are now described in detail with reference to the accompanying drawings.

First Embodiment

Figure 1A:
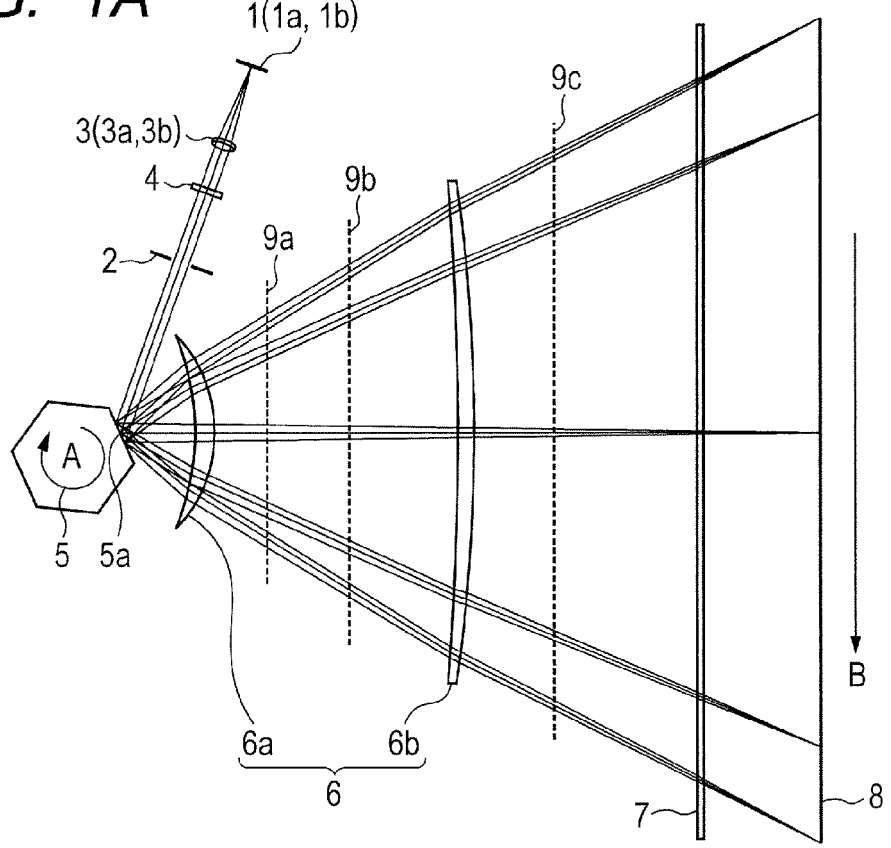
FIG. 1A is a view illustrating a main-scanning cross section of a scanning optical apparatus according to a first embodiment of the present invention.
Figure 1B:
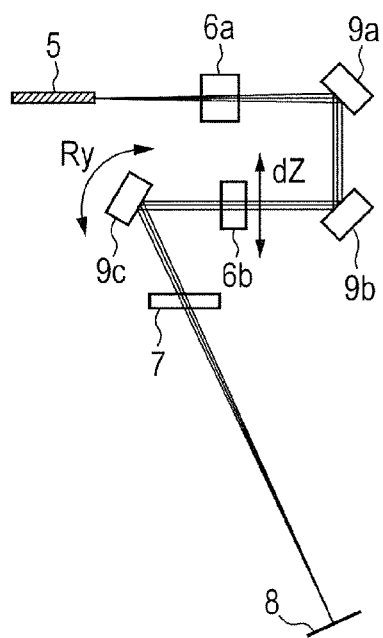
FIG. 1B is a view illustrating a sub-scanning cross section of the scanning optical apparatus according to the first embodiment of the present invention.

FIG. 1A is a view illustrating a main-scanning cross section of a scanning optical apparatus according to a first embodiment of the present invention. FIG. 1B is a view illustrating a sub-scanning cross section of the scanning optical apparatus according to the first embodiment of the present invention. The main scanning direction (Y direction) identifiable in this context is a direction perpendicular to a rotation axis of a deflecting unit 5 and an optical axis of an imaging optical system 6 (X direction) (a direction along which a light beam is deflected by the deflecting unit 5 (deflection scanning)). The sub-scanning direction (Z direction) identifiable in this context is a direction parallel to the rotation axis of the deflecting unit 5. The main-scanning cross section identifiable in this context is a plane including the optical axis of the imaging optical system 6 and the main scanning direction. The sub-scanning cross section identifiable in this context is a cross section including the optical axis of the imaging optical system 6 and perpendicular to the main-scanning cross section.

As illustrated in FIG. 1A, a light source unit (e.g., a semiconductor laser) 1 includes multiple light emitting points (1a and 1b). Diverged light fluxes emitted from the light source unit 1 (1a and 1b) are converted into substantially collimated light beams by a collimator lens 3 (3a and 3b). The converted substantially collimated light beams are imaged near a deflecting surface 5a of the polygon mirror (deflecting unit) 5 as a dine image elongated in the main scanning direction by a cylindrical lens 4 that has a power only in the sub-scanning direction. A width of the light beam entered into the cylindrical lens 4 is limited in both the main scanning direction and the sub-scanning direction by an aperture stop 2. The aperture stop 2, the collimator lens 3, and the cylindrical lens 4 constitute an incident optical system.

The optical deflector 5 as the deflecting unit includes, for example, a rotating polygon mirror, being rotated at a constant speed in a direction of an arrow A illustrated in FIG. 1A by a driving unit (not shown) such as a motor.

Imaging optical elements (toric lenses) 6a and 6b having an fθ characteristic image the light beams deflected by the optical deflector 5 on a photosensitive drum surface (surface to be scanned) 8 in a spot shape. The scanning optical apparatus according to the first embodiment further includes reflecting mirrors 9a, 9b, and 9c and a dustproof glass 7. With a rotation of the polygon mirror 5 in the direction of the arrow A, the photosensitive drum surface 8 is optically scanned in a direction of an arrow B to form a scanning line (not shown), and thus an image recording is performed. The toric lenses 6a and 6b have a function of correcting an angle error by causing the deflecting surface 5a of the optical deflector 5 or its neighborhood and the photosensitive drum surface 8 or its neighborhood to establish a conjugate relation in the sub-scanning cross section. The toric lenses 6a and 6b and the reflecting mirrors 9a, 9b, and 9c constitute the imaging optical system.

An optical unit that is mentioned below is a unit including the light source unit, the incident optical system, the deflecting unit, and the imaging optical system.

A profile of an optical functional surface of the toric lenses 6a and 6b according to the first embodiment is expressed by the following equations. Given that an intersection of each lens surface of the toric lenses 6a and 6b and the optical axis is set to the origin, a direction of the optical axis is set to the x axis, direction perpendicular to the optical axis in the main-scanning cross section is set to the y axis, and a direction perpendicular to the optical axis in the sub-scanning cross section is set to the z axis, for the meridional direction corresponding to the main scanning direction, the profile is expressed by $$x = \frac{y^2/R}{1 + \sqrt{1 - (1+k)y^2/R^2}} + \quad \text{(Equation A)}$$

$$A_2 y^2 + A_4 y^4 + A_6 y^6 + A_8 y^8 + A_{10} y^{10}$$

where R is a curvature radius and k, $A_4$, $A_6$, $A_8$, and $A_{10}$ are aspherical coefficients. For the sagittal direction corresponding to the sub-scanning direction (a direction including the optical axis and perpendicular to the main scanning direction), the profile is expressed by $$x = \frac{cz^2}{1 + \sqrt{1 - c^2 z^2}} \quad \text{(Equation B)}$$

$$c = c_0 + B_2 y^2 + B_4 y^4 + B_6 y^6 + B_8 y^8 + B_{10} y^{10}$$

where $c_0$ is a sagittal curvature on the optical axis and $B_2$, $B_4$, $B_6$, $B_8$, and $B_{10}$ are coefficients.

Figure 2A:
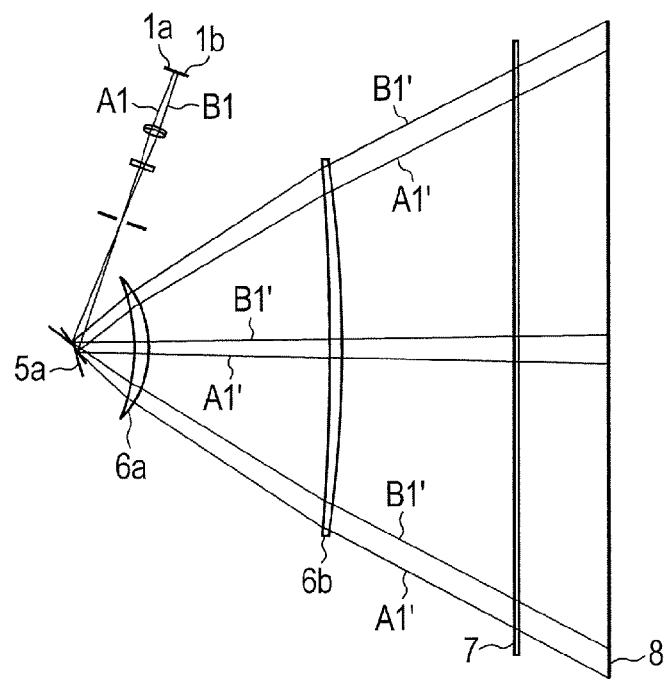
FIG. 2A is a diagram illustrating a phase matching of the multi-beam scanning optical apparatus.
Figure 2B:
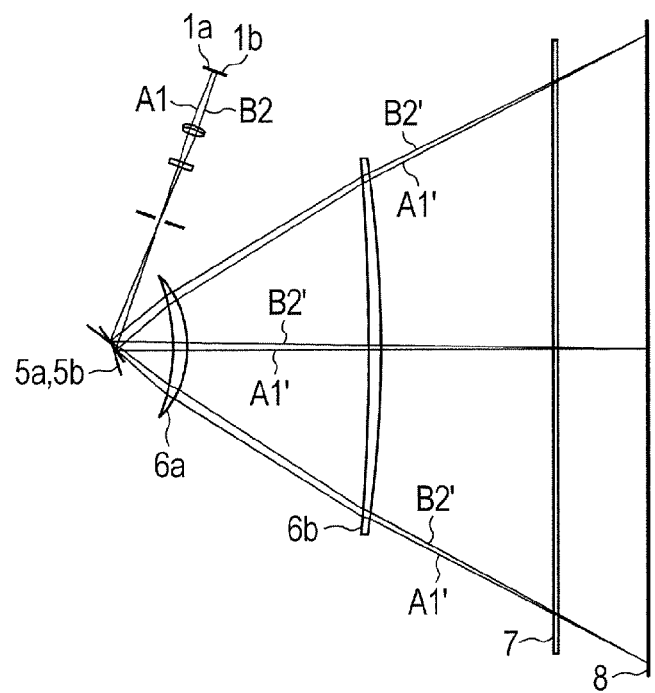
FIG. 2B is a diagram illustrating the phase matching of the multi-beam scanning optical apparatus.

In the multi-beam scanning optical apparatus, multiple light emitting points are disposed at an angle within a predetermined range in the main scanning direction and the sub-scanning direction. Therefore, as illustrated in FIG. 2A, a light beam A1 and a light beam B1 respectively emitted from the multiple light emitting points 1a and 1b are entered into different positions apart from each other in the main scanning direction on the deflecting surface of the optical deflector (polygon mirror), and angles of the light beams reflected and deflected by the optical deflector are also different from each other. Therefore, spots are imaged on different positions apart from each other in the main scanning direction on the photosensitive drum surface 8. For this reason, in the multi-beam scanning optical apparatus having this configuration, image data is sent with a shifted timing by a predetermined time δT such that an imaging position of a light beam in the main scanning direction from another light emitting point is matched to a point on the surface to be scanned in the main scanning direction at which a predetermined reference light emitting point is imaged. The deflecting surface 5a with the timing shifted by δT is set to an angle of a deflecting surface 5b illustrated in FIG. 2B, and a light beam B2 reflected and deflected by the deflecting surface 5b at this time is reflected and deflected in a direction of a light beam B2', i.e., the same direction of a light beam A1' as the light beam A1. As a result, the imaging points of the spots in the main scanning direction match each other.

Figure 3A:
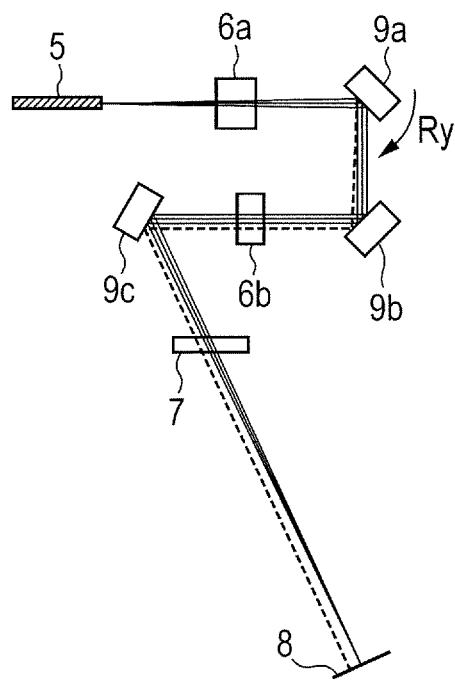
Figure 3B:
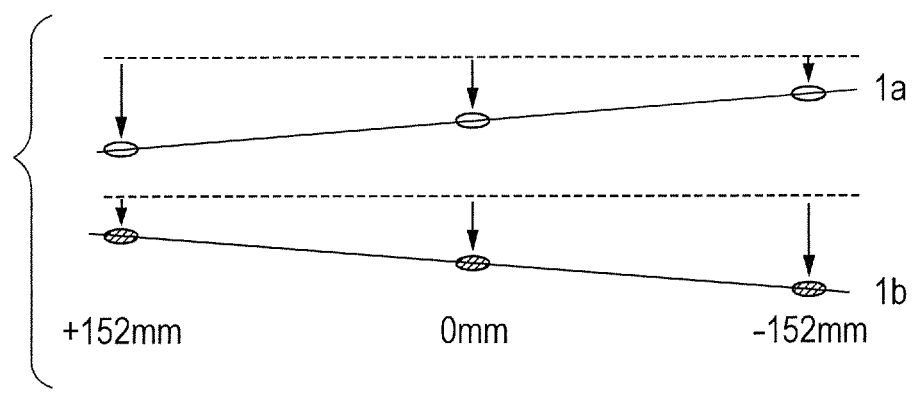

A fluctuation of irradiated positions of multiple light beams emitted from the light source unit 1 on the photosensitive drum surface 8 in the sub-scanning direction when a mounting posture of the above-mentioned optical element is changed with respect to the optical unit is reviewed. For example, it is assumed that a posture of the mirror 9a is tilted in a direction of Ry as illustrated in FIG. 3A so that a light beam travels along a locus indicated by a dashed line illustrated in FIG. 3A and arrives at the photosensitive drum surface 8. An amount of change of the irradiated position corresponding to each light emitting point (1a and 1b) of the multi-beam at three image heights of +152 mm, 0 mm, and −152 mm on the photosensitive drum surface 8 is illustrated in FIG. 3B. As illustrated in FIG. 3B, the irradiated position of the light beam from each of the light emitting points in the sub-scanning direction is moved in the same direction with respect to a design position (a dotted line in FIG. 3B) for all three image heights. However, the amount of change of the irradiated position of each image height is different depending on the light emitting point. The amount of change of the irradiated position of the light beam from the light emitting point 1a is decreased as the image height changes from +152 mm to −152 mm, while the amount of change of the irradiated position of the light beam from the light emitting point 1b is increased as the image height changes from +152 mm to −152 mm. Therefore, an irradiation position interval between these light beams in the sub-scanning direction is increased as the image height changes from +152 mm to −152 mm, causing an asymmetry.

This phenomenon is caused by a deviation of an incident position, in the sub-scanning direction, of a light beam when the light beam is entered into the toric lens 6b that has a power in the sub-scanning direction from a designed position (a position on which the light beam is incident under a condition that all the optical members are in a state of an initial design). By setting a time difference of 6T as described referring to FIGS. 2A and 2B, the light beams (A1 and B1) from the respective light emitting points are incident on different positions of the toric lens 6b. Therefore, a power in the sub-scanning direction becomes different due to a refractive power difference because a curvature in the sub-scanning direction is different at a position of the toric lens 6b on which the light beam from each of the light emitting points is incident or because an incident angle is different in the main scanning direction. As a result, even if the light beam from each of the light emitting points is entered into the toric lens 6b with a shift of the substantially same amount in the sub-scanning direction, the irradiated position on the photosensitive drum surface in the sub-scanning direction is different between the light emitting points because the optical path is different after passing through the toric lens 6b. In addition, a magnitude of a main scanning angle at which the light beam from each of the light emitting points is entered into the toric lens 6b, is reversed between a case for the image height +152 mm and a case for the image height −152 mm, and hence the asymmetry occurs relative to the image height.

It can be considered that a shift of the irradiated position on the photosensitive drum surface 8 in the sub-scanning direction is corrected by, for example, moving the toric lens 6b in the sub-scanning direction. However, the position on the toric lens 6b in the sub-scanning direction on which the light beam is incident is still shifted from the designed position, and hence the irradiation position interval between the light beams from the light emitting points on the photosensitive drum surface 8 in the sub-scanning direction remains asymmetric. Up to now, the toric lens 6b is moved to suppress the asymmetry of the irradiation position interval in the sub-scanning direction to some extent by shifting intentionally a target value of the irradiated position in the sub-scanning direction in a uniform manner. However, considering a fluctuation in manufacturing a system due to mounting of the optical elements or the like, when the lateral magnification of the imaging optical system is 1.0 or larger, it is not desirable because an irradiation position interval asymmetry Δ in the sub-scanning direction and a sensitivity on the change of the irradiated position due to the fluctuation of the light beam incident position on the toric lens 6b in the sub-scanning direction is increased.

Figure 4:
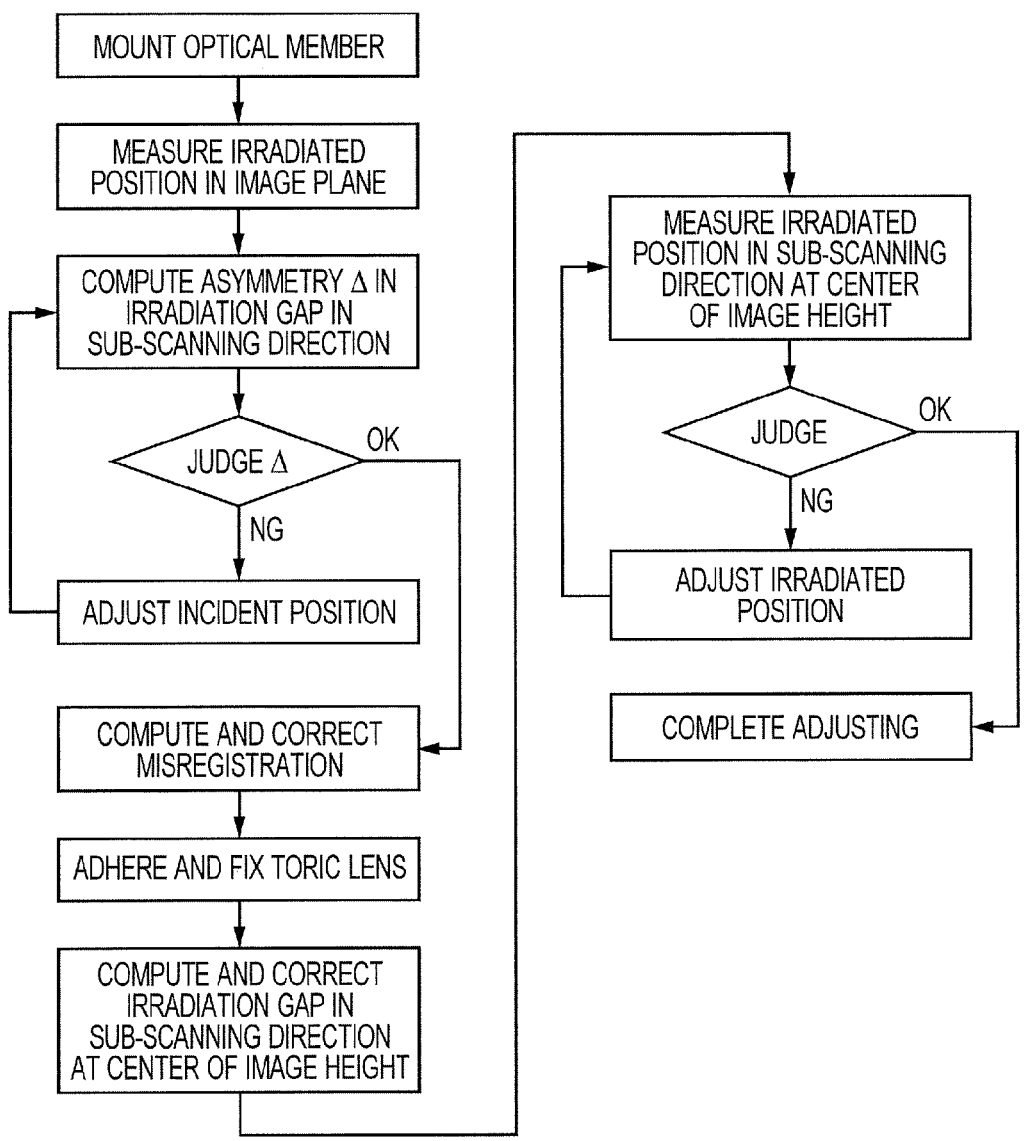
FIG. 4 is a flowchart of an assembling and adjusting process according to the first embodiment of the present invention.
Figure 5:
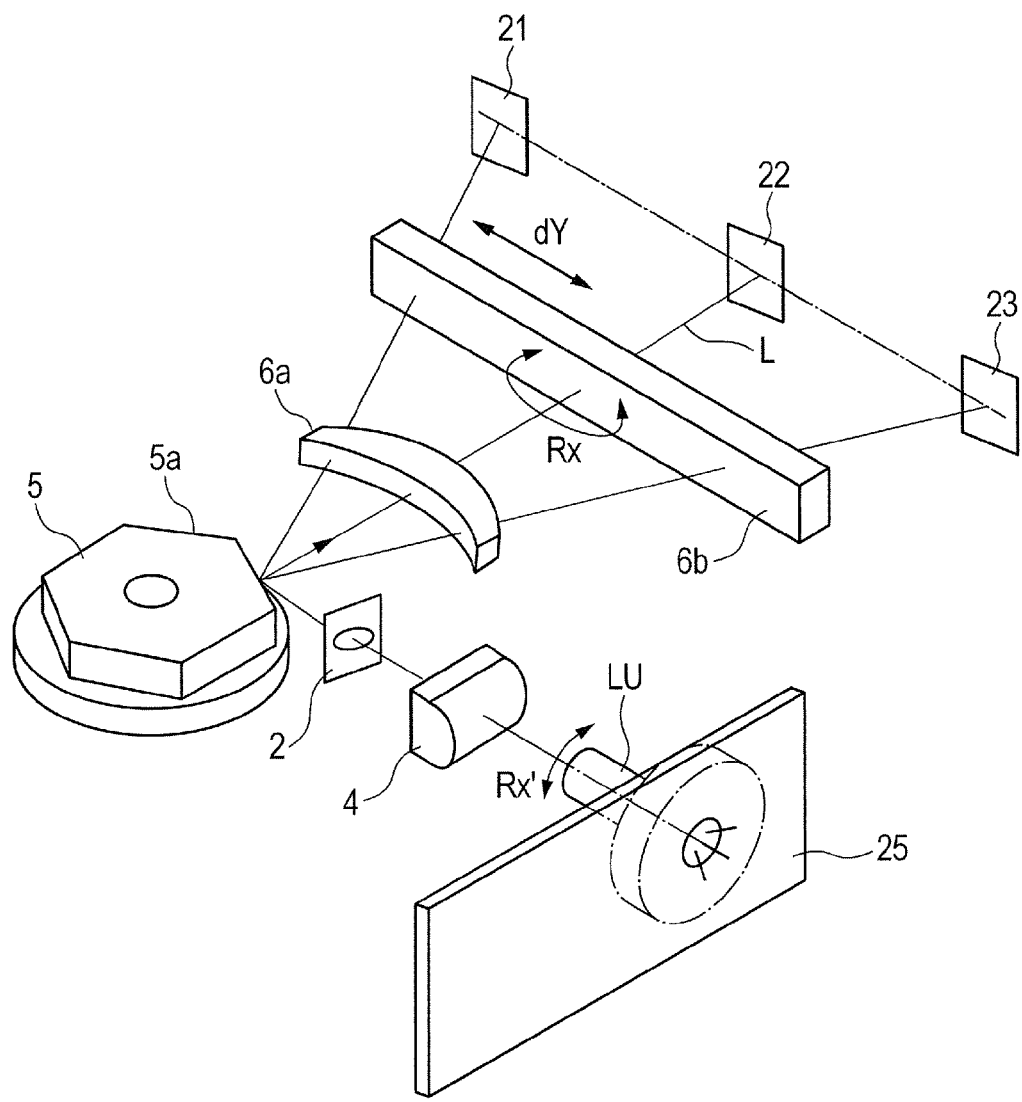
FIG. 5 is a diagram illustrating sensor arrangement and adjustment directions according to the first embodiment of the present invention.

To cope with this problem, in the present invention, an assembling and adjusting process is performed based on a flowchart illustrated in FIG. 4. Each optical member is mounted on the optical unit (not shown), the light emitting points 1a and 1b are turned on only for a predetermined time while rotating the polygon mirror 5, and then an irradiated position Y in the main scanning direction and an irradiated position Z in the sub-scanning direction of the light beams from respective light emitting points, which are entered into optical sensors 21, 22, and (first optical sensor) arranged at three image height positions as illustrated in FIG. 5 are detected at position corresponding to the photosensitive drum surface as the surface to be scanned. The optical sensor 22 corresponds to the image height of 0 mm, and the optical sensors 21 and 23 are arranged apart from the optical sensor 22 by the substantially same distance in the main scanning direction. An irradiation position interval of the light beam from each light emitting point on the optical sensors 21 and 23 in the sub-scanning direction is then computed. When coordinates, at which the light beam from the light emitting point 1a is entered into the optical sensor 21 are (Y21a, Z21a) and coordinates, at which the light beam from the light emitting point 1b is entered into the optical sensor 21 are (Y21b, Z21b), an irradiation position interval Δ21 of the light beam from each light emitting point in the sub-scanning direction is computed as Z21a'Z21b. Similarly in the optical sensor 23, an irradiation position interval Δ23 in the sub-scanning direction is computed as Z23a−Z23b. If the irradiation position interval asymmetry Δ(=Δ21−Δ23) between two light beams in the sub-scanning direction in the optical sensors 21 and 23 is equal to or larger than a predetermined value, the toric lens 6b is moved in the sub-scanning direction by an amount computed from a known sensitivity such that the light beam incident position approaches its designed position. If the asymmetry Δ falls within a predetermined range, the movement of the toric lens 6b in the sub-scanning direction is completed (incident position adjustment). Although the irradiation position interval asymmetry in the sub-scanning direction can be adjusted by moving a toric lens having a power in the sub-scanning direction among the toric lenses constituting the imaging optical system, it is preferred to move a toric lens in the sub-scanning direction, which has the largest power in the sub-scanning direction. In the first embodiment, the toric lens 6b has the largest power in the sub-scanning direction among the toric lenses constituting the imaging optical system. The toric lens having the largest power in the sub-scanning direction indicates a toric lens that has a larger power in the sub-scanning direction as compared to any other toric lenses in any position in the main scanning direction, which is determined by comparing powers of the toric lenses in the sub-scanning direction in the entire scanning range in the main scanning direction.

Subsequently, a correction for a misregistration is performed. Each of the positions on the optical sensors 21, 22, and 23, on which the light beam from the light emitting point 1a is entered, is detected, and then a registration value is computed as follows.

Figure 6A:
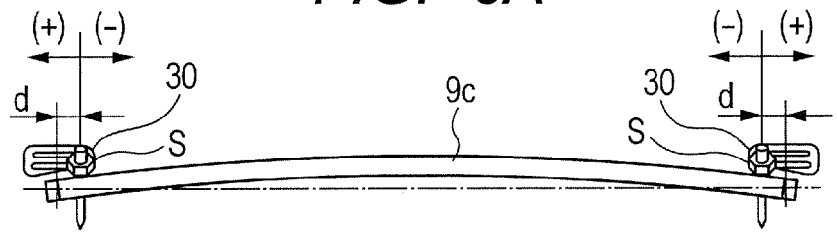
FIG. 6A is a diagram illustrating adjustment of a mirror curvature according to the first embodiment of the present invention.
Figure 6B:
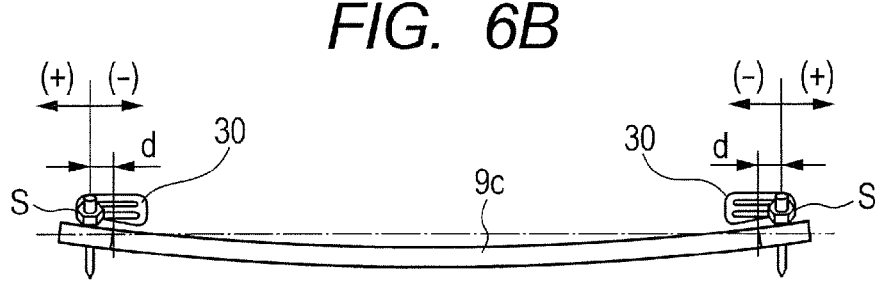
FIG. 6B is a diagram illustrating the adjustment of the mirror curvature according to the first embodiment of the present invention.

(1) Tilt of the irradiated position in the sub-scanning direction: Z21a'Z23a (2) Skew of the irradiated position in the sub-scanning direction: (Z21a+Z23a)/2−Z22a (3) One side magnification of the irradiated position in the main scanning direction: (Y21a+Y23a)−2×Y22a In the first embodiment, a correction for the tilt of the irradiated position in the sub-scanning direction of the item (1) is performed by rotating the toric lens 6b about the optical axis (L in FIG. 5) in a direction of Rx illustrated in FIG. 5. The reason why the optical axis of the toric lens 6b is taken as the rotation center is because the irradiation position interval asymmetry Δ in the sub-scanning direction corrected above is changed if the rotation center position does not correspond to the optical axis. A correction for the skew of the irradiated position in the sub-scanning direction of the item (2) is performed by curving the mirror 9c in a direction of a reflection surface by moving a slider S from side to side while holding down the mirror 9c in the direction of the reflection surface with a leaf spring 30 as illustrated in FIGS. 6A and 6B. A correction for the one side magnification of the irradiated position in the main scanning direction of the item (3) is performed by moving the toric lens 6b in a direction of dY illustrated in FIG. 5. Although the correction for the misregistration is performed by moving the toric lens 6b and deforming the mirror 9c in the first embodiment, an electrical correction of the irradiated position can also obtain the same effect on the photosensitive drum surface 8 without causing any problem. Although a case of correcting the misregistration is herein described assuming a scanning optical apparatus to be used for a color image forming apparatus, this correction method can also be applied to a scanning optical apparatus for a monochrome image forming apparatus employing a multi-beam optical system.

At the time when the correction for the misregistration is completed, the toric lens 6b is fixed (for example, using an adhesive) to the optical unit. Subsequently, a deviation of an irradiation position interval Δ22 (=Z22a−Z22b) in the sub-scanning direction in the optical sensor 22 located at the center image height (image height of 0 mm) from an amount computed from a predetermined resolution (DPI) is corrected by, for example, rotating a laser unit LU (a unit in which the light source unit 1 and the collimator lens 3 are integrated) about the optical axis in a direction of Rx' illustrated in FIG. 5. The laser unit LU is then fixed to the optical unit and an electrical circuit board 25 is mounted thereon.

Figure 7:
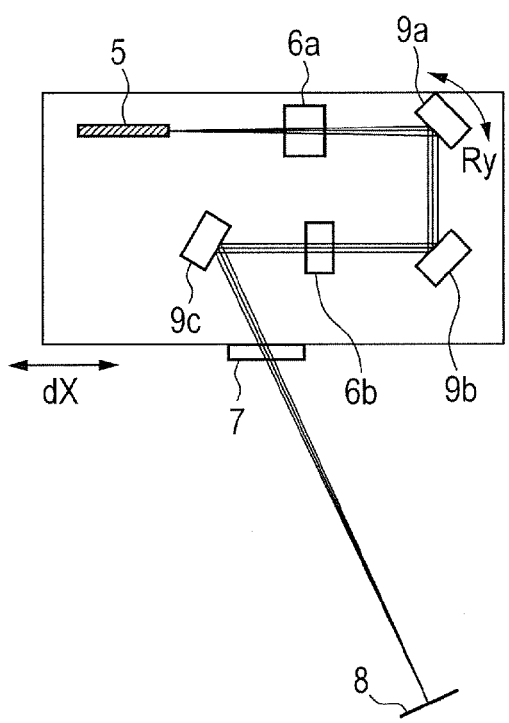
FIG. 7 is a diagram illustrating another method of adjusting an irradiated position according to the first embodiment of the present invention.

At this point, the irradiated position Z22a in the sub-scanning direction obtained by the light beam from the light emitting point 1a on the optical sensor 22 is still deviated from a predetermined position, and hence, for example, the irradiated position in the sub-scanning direction is corrected (irradiated position adjustment) by rotating the mirror 9c, which is a reflecting member located between the toric lens 6b and the photosensitive drum surface 8, in a direction of Ry illustrated in FIG. 1B. However, the method of correcting the irradiated position in the sub-scanning direction is not limited to the correction by rotating the reflecting member 9c located between the toric lens 6b and the photosensitive drum surface 8 described as an example in the first embodiment. For example, as illustrated in FIG. 7, the irradiated position can be adjusted by adjusting a position of an optical unit (dX) while detecting an irradiated position in the sub-scanning direction when mounting the optical unit on a main body of an image forming apparatus and adjusting a relative position with respect to the photosensitive drum surface that is the surface to be scanned. With this step, the process of assembling and adjusting the optical elements is completed.

In the incident position adjustment according to the first embodiment, a movement of the toric lens 6b itself in the sub-scanning direction is performed to restore the light beam incident position in the sub-scanning direction of the toric lens 6b having a power in the sub-scanning direction to its designed position. However, not only with this method, but also by performing a posture adjustment of the mirror 9a or the mirror 9b as illustrated in FIG. 7, the incident position of the light beam on the toric lens 6b can be restored to its designed position. The reason why the irradiated position adjustment in the sub-scanning direction is performed by changing the posture of the mirror 9c located between the toric lens 6b and the photosensitive drum surface 8 is because a posture change of an optical member subsequent to the toric lens 6b (closer to the surface to be scanned than the toric lens 6b) does not cause a change of the irradiation position interval in the sub-scanning direction that is previously adjusted. In addition, although the irradiated position adjustment is performed after the incident position adjustment based on the flowchart illustrated in FIG. 4 in the first embodiment, the assembling and adjusting method according to the present invention is not limited thereto, but the incident position adjustment can be performed after the irradiated position adjustment.

In the first embodiment, although a system including a laser light source (light source unit) with two light emitting points is described, if a laser light source with three or more light emitting points is used, light beams emitted from two light emitting points farthest from a light emitting point center of the laser can be detected by the optical sensors. A vertical cavity surface emitting laser (VCSEL) can be used as the light source unit. The vertical cavity surface emitting laser can be easily used to obtain a multi-beam from the configurational merits of its elements and is generally adopted to achieve a high speed and high-resolution operation, and hence applying the present invention to a scanning optical apparatus including the vertical cavity surface emitting laser as the light source unit can obtain a prominent effect. In addition, the present invention can also be applied to a vertical cavity surface emitting laser in which light emitting points are arranged in a two-dimensional array. Table 1 shows optical arrangement, profile, and characteristics of a used glass material of each lens in the optical system according to the first embodiment. Table 2 shows profiles of optical surfaces of the toric lens 6a and the toric lens 6b. Symbols used in Table 2 are the same as those used in (Equation A) and (Equation B) described above.

TABLE 1

| Basic specification | | |
| --- | --- | --- |
| Operating wavelength | λ (nm) | 790 |
| Scanning angle | θ (deg) | 39.36 |
| fθ coefficient | f | 227.09 |
| Radius of polygon circumscribing circle | R (mm) | 20 |
| Number of planes of polygon | M | 6 |
| Incident angle in sub-scanning direction | ε (deg) | 0 |
| Incident angle in deflecting direction | γ (deg) | 70 |
| Arrangement of incident system | | |
| Distance between light source and collimator lens | d1 (mm) | 30.3 |
| Center thickness of collimator lens 1 | d2 (mm) | 1.0 |
| Center thickness of collimator lens 2 | d3 (mm) | 2.0 |
| Distance between collimator lens and cylindrical lens | d4 (mm) | 4.9 |
| Center thickness of cylindrical lens | d5 (mm) | 2.0 |
| Distance between cylindrical lens and deflecting surface | d6 (mm) | 97.1 |
| Refractive index of collimator lens 1 | n1 | 1.78501 |
| Refractive index of collimator lens 2 | n2 | 1.58228 |
| Refractive index of cylindrical lens | n3 | 1.52397 |

| | Meridional curvature R | | Sagittal curvature r | |
| --- | --- | --- | --- | --- |
| | First surface | Second surface | First surface | Second surface |
| Collimator lens 1 | 43.63 | 15.52 | — | — |
| Collimator lens 2 | 15.52 | −21.49 | — | — |
| Cylindrical lens | ∞ | ∞ | 50.65 | ∞ |
| Arrangement of scanning system | | | | |
| Distance between deflecting surface and toric lens 1 | D1 (mm) | | 30.0 | |

TABLE 1-continued

| Center thickness of toric lens 1 | D2 (mm) | 7.5 |
| --- | --- | --- |
| Distance between toric lens 1 and toric lens 2 | D3 (mm) | 91.0 |
| Center thickness of toric lens 2 | D4 (mm) | 5.5 |
| Distance between toric lens 2 and surface to be scanned | D5 (mm) | 132.5 |
| Refractive index of toric lens 1 | n4 | 1.52397 |
| Refractive index of toric lens 2 | n5 | 1.52397 |

| | Meridional curvature R | | Sagittal curvature r | |
| --- | --- | --- | --- | --- |
| | First surface | Second surface | First surface | Second surface |
| Toric lens 1 | −63.89 | −41.72 | −1000.00 | −1000.00 |
| Toric lens 2 | −1162.65 | 1578.52 | −1000.00 | −33.28 |

TABLE 2

| | Toric lens 6a | | Toric lens 6b | |
| --- | --- | --- | --- | --- |
| | First surface | Second surface | First surface | Second surface |
| R | −6.38933E+01 | −4.17172E+01 | −1.16265E+03 | 1.57852E+03 |
| K | −4.85430E+00 | −1.30403E+00 | | −1.37581E+03 |
| A2 | | | | |
| A4 | 2.88996E−07 | 7.71306E−10 | | −1.65228E−07 |
| A6 | −2.57796E−10 | 1.27316E−10 | | 1.15990E−11 |
| A8 | −5.11634E−14 | −3.66856E−13 | | −6.81945E−16 |
| A10 | 9.71935E−17 | 1.58269E−16 | | 1.79775E−20 |
| C0 | −1.00E−03 | −1.00E−03 | −1.00000E−03 | −3.00464E−02 |
| B2 | | | | 1.47351E−06 |
| B4 | | | | −2.54121E−10 |
| B6 | | | | 2.97387E−14 |
| B8 | | | | −1.46895E−18 |
| B10 | | | | −3.94788E−25 |

Figure 8:
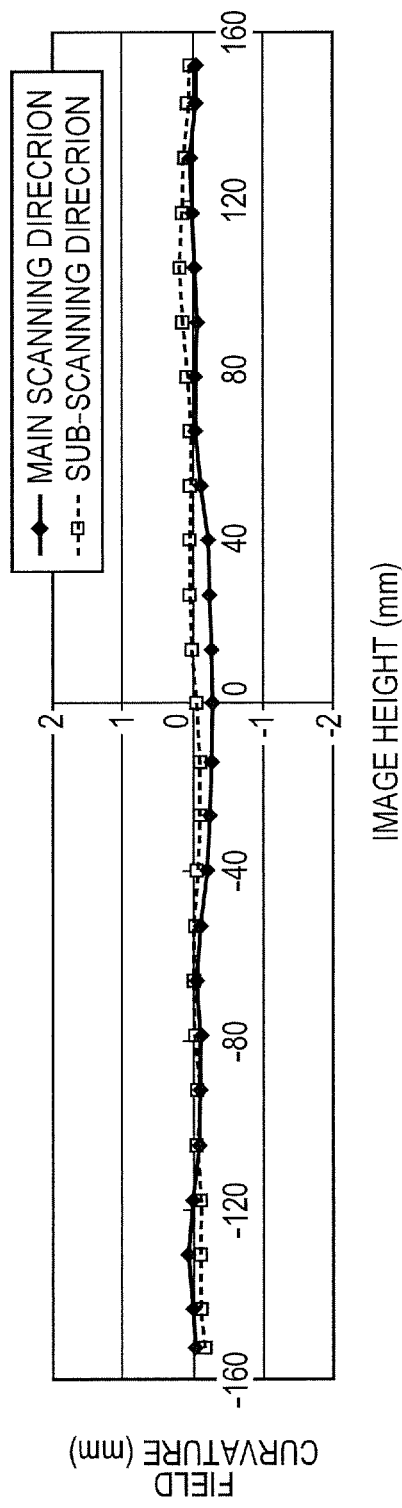
FIG. 8 is a graph showing an amount of a field curvature according to the first embodiment of the present invention.
Figure 9:
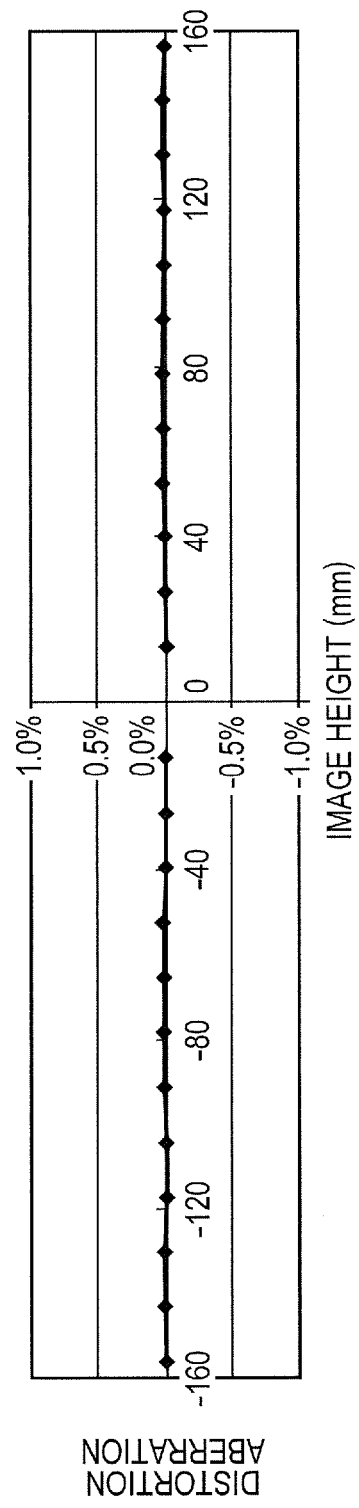
FIG. 9 is a graph showing an fθ characteristic of an optical system according to the first embodiment of the present invention.
Figure 11A:
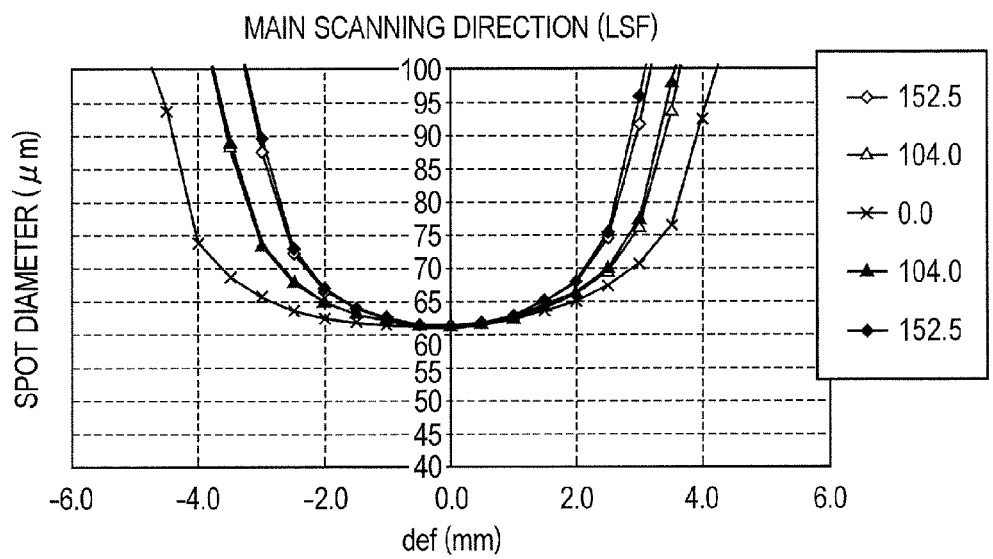
FIG. 11A is a graph showing a defocus characteristic of a spot diameter according to the first embodiment of the present invention.
Figure 11B:
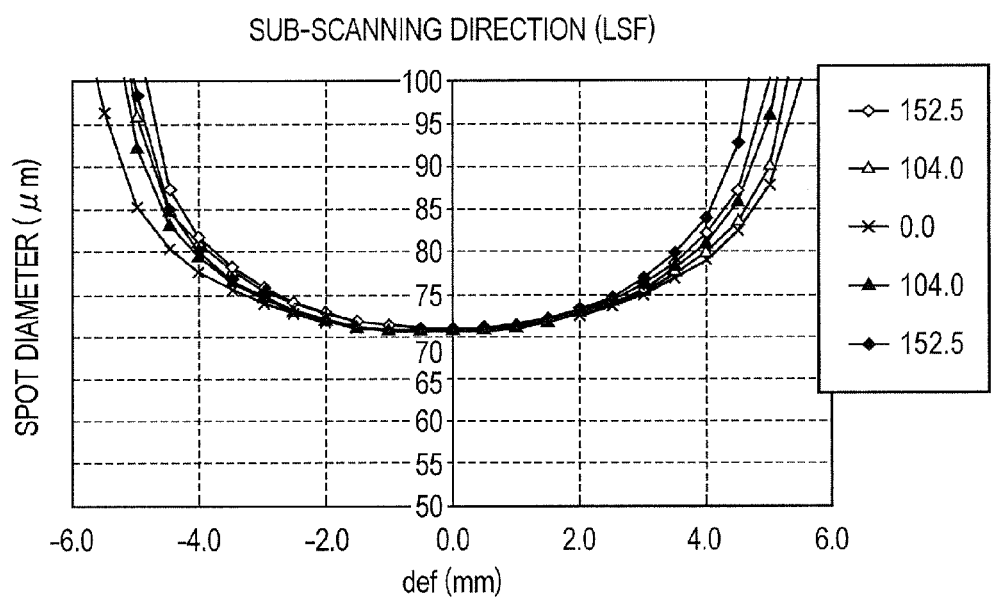
FIG. 11B is a graph showing the defocus characteristic of the spot diameter according to the first embodiment of the present invention.

FIG. 8 shows a field curvature on the surface to be scanned in the optical system according to the first embodiment, and FIG. 9 shows the fθ characteristic of the optical system according to the first embodiment. FIGS. 10A, 10B, 10C, 10D, and 10E illustrate spot profiles on the surface to be scanned in the optical system according to the first embodiment (contours of 5%, 10%, 13.5%, 36.8%, and 50% with respect to a peak optical intensity), and FIGS. 11A and 11B show spot diameters in the main scanning direction and the sub-scanning direction, respectively, when an image plane position is defocused.

In the imaging optical system according to the first embodiment, an example of amount of the irradiation position interval asymmetry Δ in the sub-scanning direction at the ±152 mm image height when a posture of an optical member arranged in front of the polygon mirror 5 (on the light source unit 1 side) is deviated is shown in Table A sum of values of Δ in Table 3 is 3.7 µm.

TABLE 3

| Item | Fluctuation amount | Δ |
| --- | --- | --- |
| Tilt of laser unit LU | 2.2 arc-minute | 1.6 µm |
| Height shift of aperture stop 2 | 0.1 mm | 1.3 µm |
| Height shift of cylindrical lens 4 | 0.03 mm | 0.8 µm |

The sensitivity on change of the irradiation position interval asymmetry Δ in the sub-scanning direction at the ±152 mm image height when the toric lens 6b is moved in a direction of dZ illustrated in FIG. 1B is 13.0 µm/mm. The sensitivity on change of the irradiated position in the sub-scanning direction on the image plane when the toric lens 6b is moved in the direction of dZ is 2.0 mm/mm, and the sensitivity on change of the irradiated position in the sub-scanning direction when the mirror 9c is tilted in the direction of Ry is 0.064 mm/arc-minute. In order to correct the above-mentioned asymmetry of Δ=3.7 μm, it suffices to move the toric lens 6b by 3.7/13=0.28 mm in the sub-scanning direction. The irradiated position in the sub-scanning direction is changed by 0.28×2.0=0.56 mm on the image plane by moving the toric lens 6b, and hence an adjustment can be taken to restore the irradiated position in the sub-scanning direction to its designed position by tilting the mirror 9c in the direction of Ry by 0.56/0.064=8.7 arc-minute.

Second Embodiment

Figure 12:
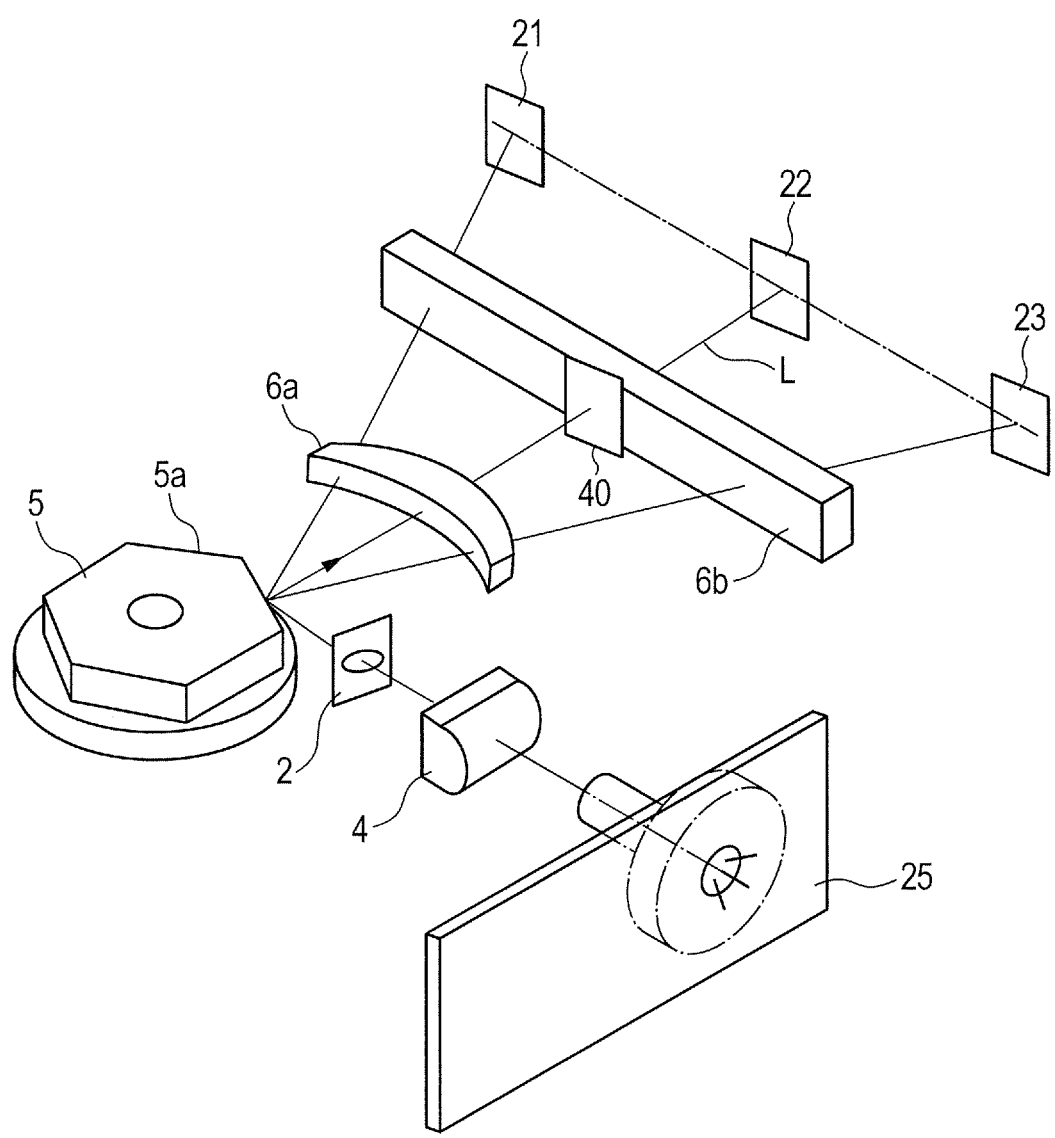
FIG. 12 is a diagram illustrating a sensor arrangement according to a second embodiment of the present invention.
Figure 13:
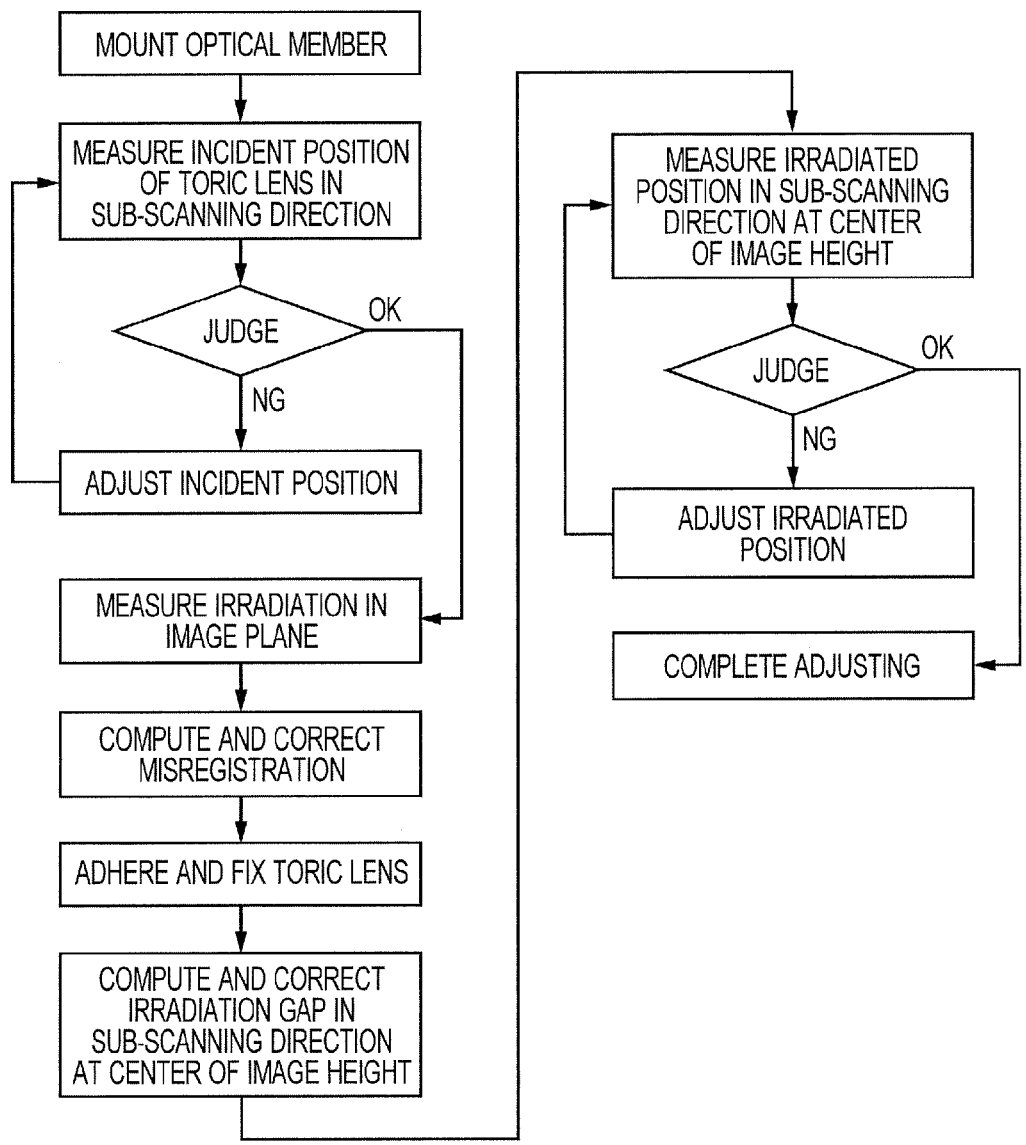
FIG. 13 is a flowchart of an assembling and adjusting process according to the second embodiment of the present invention.

FIG. 12 is a diagram illustrating a sensor arrangement in a method of assembling and adjusting a multi-beam scanning optical apparatus according to a second embodiment of the present invention, in which elements assigned with the same reference symbols are the same as those described in the first embodiment. FIG. 13 is a flowchart of an assembling and adjusting process according to the second embodiment. The second embodiment is different from the first embodiment in that an optical sensor (e.g., a line CCD) 40 (second optical sensor) is arranged right in front of a toric lens 6b (on the deflecting unit side). Instead of evaluating the asymmetry by detecting an interval of the irradiated positions in the sub-scanning direction with optical sensors 21 and 23, a position of the light beam in the sub-scanning direction, which is entered into the toric lens 6b is detected with the optical sensor 40. If a detected incident position ΔZ in the sub-scanning direction is deviated by a predetermined value, an incident position adjustment is performed in the same manner as the first embodiment. In this case, the incident positions of the multiple light beams in the sub-scanning direction, which are entered into the toric lens 6b are adjusted by moving the toric lens 6b in the sub-scanning direction by ΔZ, thus correcting the irradiation position interval asymmetry in the sub-scanning direction. After correcting the irradiation position interval asymmetry in the sub-scanning direction, the optical sensor 40 is retracted, and in the same manner as the first embodiment, a correction for the misregistration, a correction for the irradiation position interval in the sub-scanning direction at the image height of 0 mm (the center image height), and an irradiated position adjustment in the sub-scanning direction are performed to complete the assembling process.

Image Forming Apparatus

Figure 14:
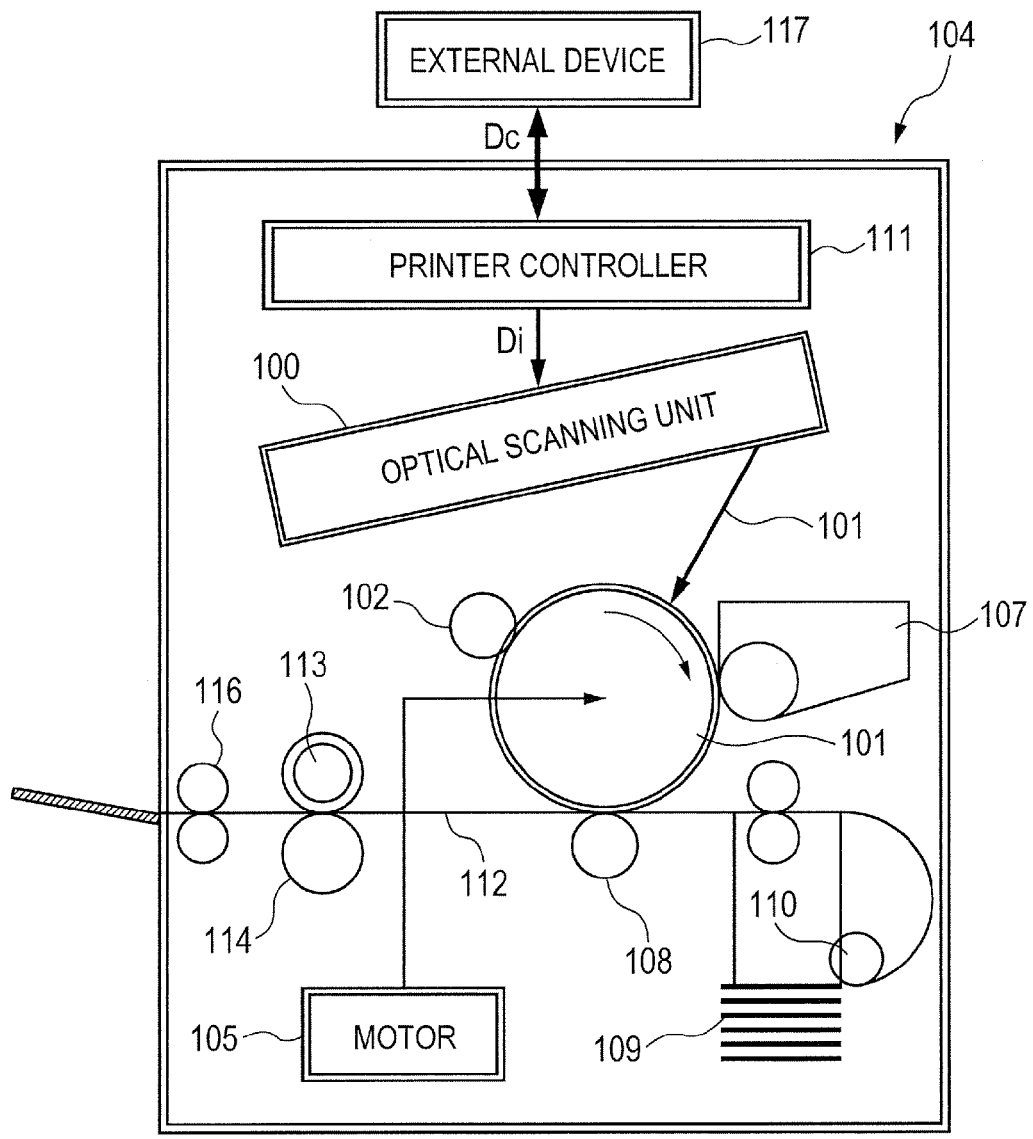
FIG. 14 is a view illustrating a sub-scanning cross section of an image forming apparatus according to an embodiment of the present invention.

FIG. 14 is a view illustrating a sub-scanning cross section of main parts of an image forming apparatus 104 according to an embodiment of the present invention.

Code data Dc is input from an external device 117 such as a personal computer to the image forming apparatus 104. The code data Dc is converted into image data (dot data) Di by a printer controller 111. The image data Di is input to a scanning optical apparatus (optical scanning unit) 100 having the configuration described in the first or second embodiment. A light beam 103 modulated in accordance with the image data Di is emitted from the optical scanning unit 100. A photosensitive surface of a photosensitive drum 101 is scanned with the light beam 103 in the main scanning direction.

The photosensitive drum 101 serving as an electrostatic latent image bearing member is rotated clockwise by a motor 115. The photosensitive surface of the photosensitive drum 101 is moved with respect to the light beam 103 in the sub-scanning direction orthogonal to the main scanning direction. At a position above the photosensitive drum 101, a charging roller 102 abuts on the surface of the photosensitive drum 101 to uniformly charge the surface of the photosensitive drum 101. The charged surface of the photosensitive drum 101 is irradiated with the light beam 103 scanned by the optical scanning unit 100, to thereby form an electrostatic latent image.

The electrostatic latent image is developed into a toner image by a developing device 107 arranged to abut on the photosensitive drum 101 on a downstream side of an irradiated position of the light beam 103, and is then transferred onto a printing sheet 112 that is a transfer target material accommodated in a printing sheet cassette 109 arranged ahead of the photosensitive drum 101 (the right side in FIG. 14) by a transfer roller 108 arranged to face the photosensitive drum 101. A feeding roller 110 is arranged at an edge portion of the printing sheet cassette 109, which feeds the printing sheet 112 in the printing sheet cassette 109 to a conveying path.

The printing sheet 112 on which the unfixed toner image is transferred in the above-mentioned manner is then conveyed to a fixing device arranged behind the photosensitive drum 101. The fixing device includes a fixing roller 113 having a fixing heater (not shown) inside and a pressure roller 114 arranged in press contact with the fixing roller 113, and fixes the unfixed toner image on the printing sheet 112 by pressing and heating the printing sheet 112 conveyed from the transfer portion at the press contact portion between the rollers 113 and 114. A discharge roller 116 is further arranged behind the fixing roller 113, which discharges the printing sheet 112 outside the image forming apparatus.

Color Image Forming Apparatus

Figure 15:
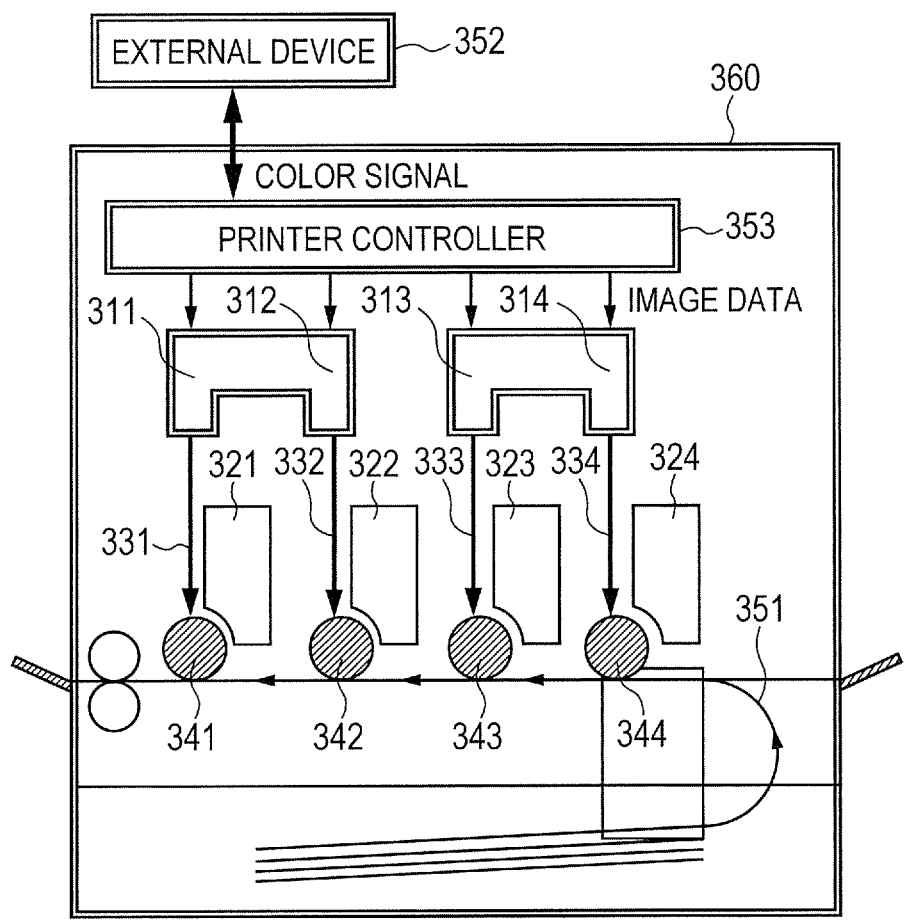
FIG. 15 is a schematic diagram illustrating main parts of a color image forming apparatus according to an embodiment of the present invention.

FIG. 15 is a schematic diagram illustrating main parts of a color image forming apparatus 360 according to an embodiment of the present invention.

The color image forming apparatus 360 is a tandem type color image forming apparatus in which four scanning optical apparatus are arranged to record image information in parallel on surfaces of photosensitive drums each serving as an image bearing member. The color image forming apparatus 360 includes scanning optical apparatus 311, 312, 313, and 314 having the configuration described in the first or second embodiment, photosensitive drums 341, 342, 343, and 344 each serving as an image bearing member, developing devices 321, 322, 323, and 324, and a conveying belt 351.

Respective color signals of red (R), green (G), and blue (B) are input from an external device 352 such as a personal computer to the color image forming apparatus 360. The color signals are converted into pieces of image data (dot data) of cyan (C), magenta (M), yellow (Y), and black (B) by a printer controller 353 in the color image forming apparatus. The pieces of image data are input to the scanning optical apparatus, respectively. Light beams 331, 332, 333, and 334 which are modulated in accordance with the respective pieces of image data are emitted from the scanning optical apparatus. Photosensitive surfaces of the photosensitive drums are scanned with the light beams in the main scanning direction. In the color image forming apparatus according to this embodiment, two sets of scanning optical apparatus (311, 312) and (313, 314) are arranged, respectively corresponding to the colors of C, M, Y, and B and recording image signals (image information) in parallel on the surfaces of the photosensitive drums, thus printing a color image at high speed.

The color image forming apparatus according to this embodiment forms latent images of different colors on the corresponding surfaces of the photosensitive drums by using the light beams based on the pieces of image data with the four scanning optical apparatus as described above. After that, the toner images of different colors are transferred onto a recording material in a superimposing manner to form a full color image.

As the external device 352, for example, a color image reading apparatus including a CCD sensor can be used. In this case, a color digital copy machine can be built with this color image reading apparatus and the color image forming apparatus 360.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-152856, filed Jul. 11, 2011, and Japanese Patent Application No. 2012-134981, filed Jun. 14, 2012, which are hereby incorporated by reference herein in their entirety.

What is claimed is:

1. A method of manufacturing a multi-beam scanning optical apparatus including a light source unit having multiple light emitting points, a deflecting unit configured to deflect multiple light beams emitted from the light source unit, and an imaging optical system having a first imaging optical element and configured to focus the multiple light beams deflected by the deflecting unit on a single surface to be scanned, the method comprising:
   irradiating the first imaging optical element with the multiple light beams;
   adjusting locations of incident positions of the irradiated multiple light beams on the first imaging optical element in a sub-scanning direction; and
   adjusting locations of irradiated positions of the multiple light beams on the single surface to be scanned in the sub-scanning direction while keeping the locations of the incident positions of the irradiated multiple light beams on the first imaging optical element the same,
   wherein the adjusting of the locations of the incident positions comprises moving the first imaging optical element in the sub-scanning direction.

2. The method of manufacturing a multi-beam scanning optical apparatus according to claim 1, wherein:
   the imaging optical system comprises multiple imaging optical elements; and
   the first imaging optical element has a largest power in the sub-scanning cross section among the multiple imaging optical elements.

3. The method of manufacturing a multi-beam scanning optical apparatus according to claim 2, wherein the adjusting of the locations of the incident positions comprises adjusting a posture of a reflecting member arranged between the deflecting unit and the first imaging optical element.

4. The method of manufacturing a multi-beam scanning optical apparatus according to claim 2, wherein the adjusting of the locations of the irradiated positions comprises adjusting a posture of a reflecting member arranged between the first imaging optical element and the single surface to be scanned.

5. The method of manufacturing a multi-beam scanning optical apparatus according to claim 2, wherein the adjusting of the locations of the irradiated positions comprises adjusting a relative position between an optical unit including the imaging optical system and the single surface to be scanned.

6. The method of manufacturing a multi-beam scanning optical apparatus according to claim 2, wherein the adjusting of the locations of the incident positions and the adjusting of the locations of the irradiated positions are performed while detecting the multiple light beams with first optical sensors respectively arranged on at least two image height positions at positions corresponding to the single surface to be scanned.

7. A method of manufacturing a multi-beam scanning optical apparatus including a light source unit having multiple light emitting points, a deflecting unit configured to deflect multiple light beams emitted from the light source unit, and an imaging optical system having a first imaging optical element and configured to focus the multiple light beams deflected by the deflecting unit on a single surface to be scanned, the method comprising:
   adjusting incident positions of the multiple light beams on the first imaging optical element in a sub-scanning direction; and
   adjusting irradiated positions of the multiple light beams on the single surface to be scanned in the sub-scanning direction without changing the incident positions on the first imaging optical element, wherein:
   the adjusting of the incident positions and the adjusting of the irradiated positions are performed while detecting the multiple light beams with first optical sensors respectively arranged on at least two image height positions at positions corresponding to the single surface to be scanned;
   the adjusting of the incident positions is performed while detecting the multiple light beams with a second optical sensor arranged on the deflecting unit side of the first imaging optical element; and
   the adjusting of the irradiated positions is performed while detecting the multiple light beams with the first optical sensors.

8. The method of manufacturing a multi-beam scanning optical apparatus according to claim 1, wherein the adjusting of the locations of the irradiated positions is performed after the adjusting of the locations of the incident positions.

9. The method of manufacturing a multi-beam scanning optical apparatus according to claim 1, wherein: the multi-beam scanning optical apparatus includes dustproof glass disposed between the imaging optical system and the single surface to be scanned, and the adjusting locations of irradiated positions is performed while keeping the locations of the incident positions of the irradiated multiple light beams on the first imaging optical element and a location of the dustproof glass the same.

10. The method of manufacturing a multi-beam scanning optical apparatus according to claim 1, further comprising mounting the light source unit, the deflecting unit, and the imaging optical system to an optical unit.

* * * * *